F. R. BLAIR.
FLEXIBLE COUPLING.
APPLICATION FILED MAR. 12, 1917.

1,271,122.

Patented July 2, 1918.

INVENTOR
F. R. Blair
BY
Dull, Warfield & Dull
ATTORNEY

UNITED STATES PATENT OFFICE.

FRANK ROSS BLAIR, OF GLEN RIDGE, NEW JERSEY, ASSIGNOR TO F. R. BLAIR & CO., INC., OF NEW YORK, N. Y., A CORPORATION OF NEW YORK.

FLEXIBLE COUPLING.

1,271,122.      Specification of Letters Patent.      Patented July 2, 1918.

Application filed March 12, 1917. Serial No. 154,167.

*To all whom it may concern:*

Be it known that I, FRANK ROSS BLAIR, a citizen of the United States, residing at Glen Ridge, in the county of Essex and State of New Jersey, have invented certain new and useful Improvements in Flexible Couplings, of which the following is a full, clear, and exact description, such as will enable others skilled in the art to which it appertains to make and use the same.

This invention relates to a coupling, and with regard to its more specific features, to an adjustable flexible coupling and is particularly applicable to the connecting of a magneto to a gas engine on an automobile.

An object of this invention is to enable a driving element to be positively coupled to a driven element, for the transmission of power while permitting fine adjustment of the parts rotatively relative to each other to an unlimited extent.

A further object is to provide a device of the character described which will secure a firm driving connection and in which the angular relation of the parts may be adjusted through any desired angle either great or small, and which may be tightened in its adjusted relation with little or no tendency for the adjustment to be changed by the tightening operation.

Another object is to provide a device of the character described which will afford both adjustability and flexibility between the driving and driven members.

A further object is to secure a device of the character described in which the accidental loosening of the adjustment is obviated but in which intentional loosening may be easily effected.

A further object is to provide a device of the character described in which the coupled parts may be readily connected and disconnected without changing the adjustment.

Other objects are in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification and wherein similar reference characters refer to similar parts throughout the several views.

Figure 1:
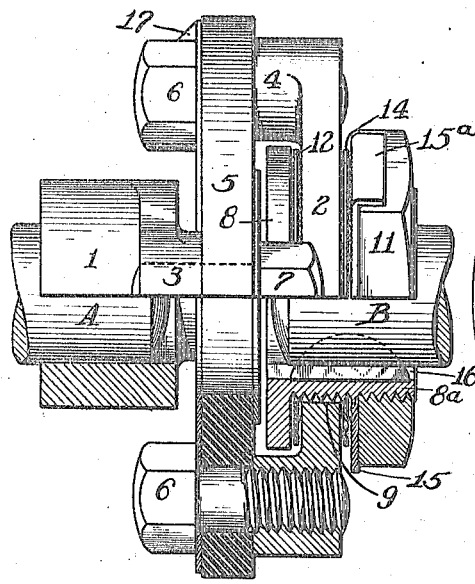
Figure 1 is an elevation of a coupling.
Figure 2:
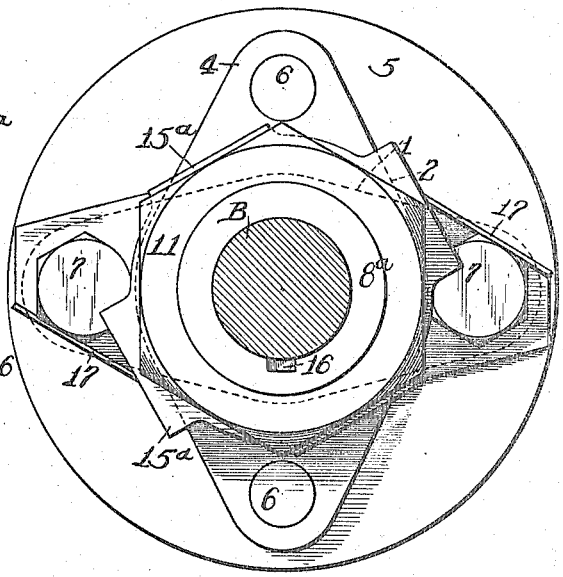
Fig. 2 is a plan view thereof.
Figure 3:
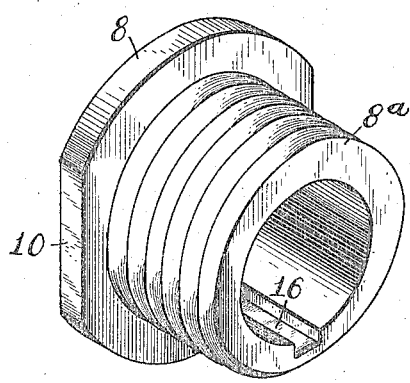
Figs. 3 and 4 are details.
Figure 4:
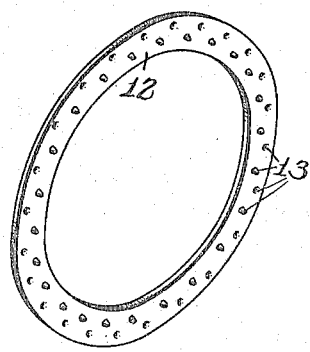

The characters A and B represent two substantially coaxial shafts either one of which may be a driving shaft and the other a driven shaft. The numerals 1 and 2 represent members which are adapted to serve as elements of power transmitting means between the shafts A and B.

Inasmuch as certain important features of the invention manifest themselves when the coupling is flexible, the disclosure herein is given in connection with a coupling of the flexible type.

Each of the members 1 and 2 is adapted to be connected at spaced circumferential points to a flexible power transmitting member and to this end, each of the members 1 and 2 is conveniently made in the form of a spider and for this reason will be referred to hereafter as spiders, having a series of radial arms 3 and 4 although obviously they need not be made in that form. A flexible disk 5 which may be composed of a vulcanized fabric is attached to the arms 3 and 4 of the spiders 1 and 2 with the arms 3 of the spider 1 spaced from the arms 4 of the spider 2 circumferentially around the disk. A practical manner of attaching the disk to the arms comprises bolts 6 and 7, extending through circumferentially spaced openings in the disk and screwed into the arms.

One of the members as 1 may be directly connected to one of the shafts as A but in order to provide angular adjustment between the shafts A and B one of the spiders as 2 is connected to its shaft as B by an adjustable connection. In the form illustrated, there is provided an intermediate power transmitting member 8 comprising a threaded sleeve 8$^a$ adapted to pass through an opening 9 in the spider 2 and having a disk or flange 10 at one end of the sleeve providing a clamping surface adapted to bear against the flat clamping surface or disk of spider 2 or a locking washer interposed therebetween.

Suitable means as a member, or nut 11, provides another clamping surface facing that of the flange 10 for holding the flange 10 in engagement with the spider 2. In order to cause a strong engagement between the flange 10 and the spider 2 there is provided a locking member, as a washer or disk 12, movable longitudinally of the sleeve and preferably of hardened steel, having teeth 13 extending outwardly from both of its opposite surfaces, which washer is placed between the flange 10 and the member 2 on the sleeve. This washer securely locks the member 8 to the spider 2 whenever the surfaces are pressed toward each other, by reason of the biting of the teeth into the surface of the flange and spider, but if the pressure be released, the washer permits any angular adjustment desired to be made.

In order to prevent the loosening of the nut 11, there may be provided another locking washer 14, similar to the washer 12 between the nut and the spider 2, and there may be provided a washer 15 of a material such as soft steel or brass which the teeth of the washer 14 may bite into, having both faces smooth. The washer 15 may be provided with ears as 15$^a$. While the nut is being tightened or loosened the nut may be allowed to slide on the washer 15, but when the tightening has been done the ears 15$^a$ may be bent up against a flat face of the nut to prevent further rotation thereof. The member 8 will preferably be fixed against rotation relative to the shaft B, being provided with a keyway to enable it to be keyed as at 16 to the shaft B of the element which the coupling is to drive as for example the rotor of a magneto.

The bolts 6 and 7 may be prevented from unintentional loosening by a locking member comprising a washer through which a plurality of the bolts 6 or 7 pass and having a portion 17 adapted to be bent up flat against the face of the nut. The members 1 and 8 thus constitute the members through which the power is transmitted to and from the coupling and may be referred to as the driving members and either member may serve as the power receiving member.

By the construction outlined it will be evident that when the nut 11 is tightened down, locking the member 2 to the member 10, the power exerted upon the member 1 will be transmitted to the member 2, permitting flexibility by reason of the disk 5. Should it be desired, however, to change the angular relation of the member 1 to the member 8 the ears 15$^a$ will be bent down, whereupon, by loosening the nut 11 and thereby loosening the engagement of the flange 10 with the member 2, the member 8 may be turned through any desired angle relative to the member 2. The nut 11 may thereupon be tightened, causing the teeth of the washers 12 and 14 firmly to engage the flange 10, the member 2 and the washer 15, securely holding them in the position to which they were adjusted. A loosening of the washer 11 and consequent change in the adjustment may now be prevented by again bending the ears 15$^a$ of the member 15 up flat against one face of the nut.

By this construction it will be evident that a flexible coupling is provided which nevertheless permits angular adjustment between the driving and driven parts. Should it be desired to disconnect the coupling without changing the angular adjustment, this may be readily done by removing the bolts 7 which attach one of the members 1 or 2 to the flexible disk, whereupon the parts may be taken apart and may be reassembled with the same angular adjustment.

It will be observed that the engaging or clutching surfaces of the flange 10, the locking members, the power transmitting member 2 and the nut 11, are in planes substantially perpendicular to the axis of the shaft to which they are applied, so that the relative adjustment of these parts is readily effected in a rotative manner. Furthermore, it will be perceived that the flange 10, the member 12, and the member 2, comprise three elements coaxially arranged, providing four surfaces adapted to mutually grip and disposed serially relatively to each other longitudinally of the shaft B, one of these elements, in the present instance, the member 12, having teeth on its opposite surfaces adapted to bite into and thereby positively clutch with the smooth surfaces of the two members next adjacent on opposite sides. Thus the range of rotary adjustment of the two shafts is unlimited and may be as fine as needed.

Thus by the above construction are accomplished among others the objects hereinbefore set forth.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. A device of the character described comprising, in combination, two driving members and means for connecting them together including a flexible power transmitting element and parts having engaging surfaces in planes perpendicular to the axis of the shaft and means for clamping said surfaces against each other for the transmission of torque at any position of angular adjustment between the driving members.

2. A device of the character described comprising, in combination, two driving members and means for connecting them together including a flexible power transmitting element and parts having engaging surfaces in planes perpendicular to the axis of the shaft, means for clamping said surfaces against each other for the transmission of torque at any position of angular adjustment between the driving members, and means to prevent slipping of said surfaces when so clamped.

3. A device of the character described, comprising in combination, two members, means for flexibly connecting said members together, a power transmitting element and means for clamping said power transmitting element to one of the members, said means comprising a washer having teeth.

4. A device of the character described, comprising in combination, two spiders each having arms, one of such spiders being provided with an axial opening, a flexible disk, means for attaching the arms of said spiders to the disk, a member having a flanged portion and a sleeve portion, said sleeve portion being adapted to pass through an axial opening in one of the spiders and means for clamping the flange of the member to the spider.

5. A device of the character described, comprising in combination, two spiders each having arms, one of such spiders being provided with an axial opening, a flexible disk, means for attaching the arms of said spiders to the disk, a member having a flanged portion and a sleeve portion, said sleeve portion being adapted to pass through an axial opening in one of the spiders, means for clamping the flange of the member to the spider with a face of the flange opposed to a face of the spider, and means for locking said faces against angular displacement, 6. A device of the character described, comprising in combination, two spiders each having arms, one of such spiders being provided with an axial opening, a flexible disk, means for attaching the arms of said spiders to the disk, a member having a flanged portion and a sleeve portion, said sleeve portion being adapted to pass through an axial opening in one of the spiders, means for clamping the flange of the member to the spider with a face of the flange opposed to a face of the spider, and means for locking said faces against angular displacement, said means comprising a washer, having teeth.

7. A device of the character described comprising, in combination, two spiders, a flexible disk, means for attaching said spiders to said disk, one of said spiders being provided with an axial opening, an auxiliary member having a sleeve portion and a flange portion, said sleeve portion being adapted to be inserted in the opening in said spider, and said flange being adapted to bear against the face of said spider, and a nut adapted to screw on the end of the sleeve portion to clamp the spider between the nut and the flange.

8. A device of the character described comprising, in combination, a driving member and a driven member, each comprising a spider having arms, a flexible disk, means for attaching the arms of said spiders to said disk, one of said spiders being provided with an axial opening, an auxiliary member having a nipple portion and a flange portion, said nipple portion being adapted to be inserted in the opening in said spider, and said flange being adapted to bear against the flanged face of said spider, a nut adapted to screw on the end of the nipple portion to clamp the spider between the nut and the flange, and means to prevent relative rotation between the auxiliary member and the spider.

9. A device of the character described, comprising, in combination, a driving member and a driven member, each comprising a spider having arms, a flexible disk, means for attaching the arms of said spiders to said disk, one of said spiders being provided with an axial opening, an auxiliary member having a nipple portion and a flange portion, said nipple portion being adapted to be inserted in the opening in said spider, and said flange being adapted to bear against the face of said spider, a nut adapted to screw on the end of the nipple portion to clamp the spider between the nut and the flange, washers having teeth on both surfaces thereof to prevent relative rotation between the auxiliary member and the spider, and means to prevent loosening of said nut.

10. A device of the character described comprising, in combination, a driving member and a driven member, each comprising a spider having arms, a flexible disk, means for attaching the arms of said spiders to said disk, one of said spiders being provided with an axial opening, an auxiliary member having a nipple portion and a flange portion, said nipple portion being adapted to be inserted in the opening in said spider, and said flange being adapted to bear against the face of said spider, a nut adapted to screw on the end of the nipple portion to clamp the spider between the nut and the flange, and washers having hardened teeth on both surfaces thereof to prevent relative rotation between the auxiliary member and the spider.

11. A device of the character described comprising, in combination, a driving member and a driven member, each comprising a spider having arms, a flexible disk, means for attaching the arms of said spiders to said disk, one of said spiders being provided with an axial opening, an auxiliary member having a nipple portion and a flange portion, said nipple portion being adapted to be inserted in the opening in said spider, and said flange being adapted to bear against the face of said spider, a nut adapted to screw on the end of the nipple portion to clamp the spider between the nut and the flange, washers having teeth on both surfaces thereof to prevent relative rotation between the auxiliary member and the spider, and a washer adapted to be placed between one of the toothed washers and the nut to prevent the loosening of said nut, said washer having a side next the nut smooth and having means for engaging the nut to prevent rotation thereof.

12. A device of the character described comprising in combination, a driving member and a driven member, each comprising a spider having arms, a flexible disk, means for attaching the arms of said spiders to said disk, one of said spiders being provided with an axial opening, an auxiliary member having a nipple portion and a flange portion, said nipple portion being adapted to be inserted in the opening in said spider, and said flange being adapted to bear against the face of said spider, a nut adapted to screw on the end of the nipple portion to clamp the spider between the nut and the flange, means comprising washers having teeth on both surfaces thereof to prevent relative rotation between the auxiliary member and the spider, and means comprising a washer adapted to be placed between one of the toothed washers and the nut to prevent loosening of said nut, said washer having a side next the nut smooth and having a means for engaging the nut to prevent rotation thereof.

13. A device of the character described comprising, in combination, a driving member and a driven member, means connecting said members together comprising two disks one of said disks being provided with a smooth comparatively soft surface and the other of said disks being provided with comparatively hard teeth whereby said disks may be caused to positively engage for the transmission of power at any angle of rotative adjustment.

14. A device of the character described comprising in combination, a driving member and a driven member, means for connecting said members together comprising a pair of disks, and a member having teeth adapted to bite into both said disks to mutually lock them together for the transmission of power.

15. A device of the character described, comprising in combination, two driving members and means for connecting said members together, including a flexible power transmitting member, and a device adapted to secure one of said driving members in angular adjustment relative to the other comprising at least three mutually gripping elements providing four serially disposed surfaces, one of said surfaces comprising teeth adapted to clutch with the surface of the next adjacent element.

16. A device of the character described comprising, in combination, two driving members and means for connecting said members together, including a flexible power transmitting member, and a device adapted to secure one of said driving members in angular adjustment relative to the other comprising at least three mutually gripping elements providing four serially disposed surfaces, two of said surfaces comprising teeth adapted to clutch with the surfaces of the next adjacent elements.

17. A device of the character described, comprising, in combination, two driving members, and means for connecting said members together, including a flexible power transmitting member, and a device adapted to secure one of said driving members in angular adjustment relative to the other comprising at least three mutually gripping elements providing four serially disposed surfaces, the opposite surfaces of one of said elements comprising teeth adapted to clutch with the surfaces of the other elements.

18. A device of the character described comprising, in combination, two driving members and means for connecting said members together, including a flexible power transmitting member, and a device adapted to secure one of said driving members in angular adjustment relative to the other comprising at least three mutually gripping elements providing four serially disposed surfaces, one of said surfaces being smooth and another comprising teeth, said smooth surface being next adjacent said toothed surface.

19. A device of the character described comprising, in combination, two driving members and means for connecting said members together, including a flexible power transmitting member, and a device adapted to secure one of said driving members in angular adjustment relative to the other comprising at least three mutually gripping elements providing four serially disposed surfaces, the opposite surface of one of said elements comprising teeth adapted to clutch with the surfaces of the other elements, and the surfaces of the other elements adjacent said toothed surface being smooth.

20. A device of the character described comprising, in combination, two rotary substantially coaxial driving shafts, and means for connecting them for the transmission of torque comprising relatively movable members having clamping surfaces facing each other, and a locking member having teeth between said surfaces adapted to bite into one of said surfaces when said members are in clamping position.

21. A device of the character described comprising, in combination, two rotary substantially coaxial driving shafts, and means for connecting them for the transmission of torque comprising relatively movable members having clamping surfaces facing each other, and a locking member having teeth between said surfaces adapted to bite into one of said surfaces when said members are in clamping position, one of said clamping members comprising a sleeve rotatable with one of said driving shafts, and said locking member being loosely mounted on said sleeve.

22. A device of the character described comprising, in combination, two rotary substantially coaxial driving shafts, and means for connecting them for the transmission of torque comprising relatively movable members having clamping surfaces facing each other, and a locking member having teeth between said surfaces adapted to bite into one of said surfaces when said members are in clamping position, one of said clamping members comprising a sleeve on one of said driving shafts fixed against rotation relative thereto, and said locking member and another of said clamping members being mounted on said sleeve, said locking member being movable longitudinally of said sleeve.

23. A device of the character described comprising, in combination, two rotary shafts, and means for connecting them for the transmission of torque comprising relatively movable members having clamping surfaces facing each other and a pair of locking members having teeth between said surfaces adapted to bite into said surfaces when said members are in clamping position, one of said clamping members comprising a flanged sleeve on one of said shafts having threads, and fixed against rotation relative to said last mentioned shaft, another of said clamping members coöperatively engaging said threads, and said locking members being mounted on said sleeve for movement longitudinally thereof.

24. A device of the character described comprising, in combination, two rotary shafts, and means for connecting them for the transmission of torque comprising relatively movable members having clamping surfaces facing each other and a pair of locking members having teeth on their opposite faces between said surfaces adapted to bite into said surfaces when said members are in clamping position, one of said clamping members comprising a flanged sleeve on one of said shafts having threads, and fixed against rotation relative to said last mentioned shaft, another of said clamping members coöperatively engaging said threads, and said locking members being mounted on said sleeve for movement longitudinally thereof, and a washer of relatively soft pliable material mounted on said sleeve between one of said locking members and said coöperative clamping member, said washer having a portion adapted to be bent up against the side of said last mentioned clamping member.

In testimony whereof I affix my signature in the presence of two witnesses.

FRANK ROSS BLAIR.

Witnesses:
 WILLIS B. RICE,
 C. J. KULBERG.